US008561172B2

(12) United States Patent
Buss et al.

(10) Patent No.: US 8,561,172 B2
(45) Date of Patent: Oct. 15, 2013

(54) SYSTEM AND METHOD FOR VIRTUAL INFORMATION CARDS

(75) Inventors: Duane Buss, West Mountain, UT (US); Andrew Hodgkinson, Pleasant Grove, UT (US); Tom Doman, Pleasant Grove, UT (US)

(73) Assignee: Novell Intellectual Property Holdings, Inc., Seattle, WA (US)

( * ) Notice: Subject to any disclaimer, the term of this patent is extended or adjusted under 35 U.S.C. 154(b) by 1184 days.

(21) Appl. No.: 12/201,754

(22) Filed: Aug. 29, 2008

(65) Prior Publication Data
US 2010/0058435 A1  Mar. 4, 2010

(51) Int. Cl.
*G06F 12/00* (2006.01)
*G06F 15/16* (2006.01)

(52) U.S. Cl.
USPC .................................. 726/20; 726/5

(58) Field of Classification Search
USPC ....................................... 726/9, 20
See application file for complete search history.

(56) References Cited

U.S. PATENT DOCUMENTS

| | | |
|---|---|---|
| 5,073,950 A | 12/1991 | Colbert et al. |
| 5,485,510 A | 1/1996 | Colbert |
| 5,546,471 A | 8/1996 | Merjanian |
| 5,546,523 A | 8/1996 | Gatto |
| 5,594,806 A | 1/1997 | Colbert |
| 5,613,012 A | 3/1997 | Hoffman et al. |
| 6,028,950 A | 2/2000 | Merjanian |
| 6,327,578 B1 * | 12/2001 | Linehan .......................... 705/65 |
| 6,481,621 B1 | 11/2002 | Herrendoerfer et al. |
| 6,513,721 B1 * | 2/2003 | Salmre et al. ................. 235/492 |
| 6,612,488 B2 | 9/2003 | Suzuki |
| 6,721,713 B1 | 4/2004 | Guheen et al. |
| 6,913,194 B2 | 7/2005 | Suzuki |
| 7,003,501 B2 | 2/2006 | Ostroff |
| 7,103,575 B1 | 9/2006 | Linehan |
| 7,104,444 B2 | 9/2006 | Suzuki |
| 7,225,156 B2 | 5/2007 | Fisher et al. |

(Continued)

FOREIGN PATENT DOCUMENTS

EP  0917120  5/1999
JP  11003382  1/1999

(Continued)

OTHER PUBLICATIONS

Computer Security Institute; "What InfoCard Is and Isn't"; http://web.archive.org/web/20060423133 805/http:/www.identityblog.com/wp-content/resources/alert.pdf, May 2006 (4 pages).

(Continued)

*Primary Examiner* — Krisna Lim
*Assistant Examiner* — Margishi Desai
(74) *Attorney, Agent, or Firm* — Marger Johnson & McCollom PC

(57) ABSTRACT

A client includes a card selector, and receives a security policy from a relying party. If the client does not have an information card that can satisfy the security policy, the client can define a virtual information card, either from the security policy or by augmenting an existing information card. The client can also use a local security policy that controls how and when a virtual information card is defined. The virtual information card can then be used to generate a security token to satisfy the security policy.

34 Claims, 13 Drawing Sheets

(56) References Cited

U.S. PATENT DOCUMENTS

| | | | |
|---|---|---|---|
| 7,353,532 B2 | 4/2008 | Duri et al. | |
| 7,360,237 B2* | 4/2008 | Engle et al. | 726/1 |
| 7,416,486 B2 | 8/2008 | Walker et al. | |
| 7,444,519 B2 | 10/2008 | Laferriere et al. | |
| 7,487,920 B2 | 2/2009 | Sato et al. | |
| 7,494,416 B2 | 2/2009 | Walker et al. | |
| 7,500,607 B2 | 3/2009 | Williams | |
| 7,529,698 B2 | 5/2009 | Joao | |
| RE40,753 E | 6/2009 | Wang et al. | |
| 7,555,460 B1 | 6/2009 | Barkan | |
| 7,565,329 B2 | 7/2009 | Lapsley et al. | |
| 7,591,424 B2 | 9/2009 | Wang et al. | |
| 7,594,258 B2 | 9/2009 | Mao et al. | |
| 7,613,659 B1 | 11/2009 | Hoffman et al. | |
| 7,620,177 B2 | 11/2009 | Ibrahim et al. | |
| 7,661,585 B2 | 2/2010 | Joao | |
| 7,664,022 B2* | 2/2010 | Hu | 370/230 |
| 7,747,540 B2 | 6/2010 | Cameron et al. | |
| 7,771,273 B2 | 8/2010 | Walker et al. | |
| 7,788,499 B2 | 8/2010 | Cameron et al. | |
| 7,831,522 B1 | 11/2010 | Satish et al. | |
| 2002/0026397 A1* | 2/2002 | Ieta et al. | 705/35 |
| 2002/0029337 A1 | 3/2002 | Sudia et al. | |
| 2002/0029342 A1 | 3/2002 | Keech | |
| 2002/0046041 A1 | 4/2002 | Lang | |
| 2002/0095360 A1 | 7/2002 | Joao | |
| 2002/0103801 A1 | 8/2002 | Lyons | |
| 2003/0061170 A1 | 3/2003 | Uzo | |
| 2003/0126094 A1 | 7/2003 | Fisher et al. | |
| 2003/0158960 A1 | 8/2003 | Engberg | |
| 2003/0172090 A1 | 9/2003 | Asunmaa et al. | |
| 2003/0217140 A1 | 11/2003 | Burbeck et al. | |
| 2003/0218062 A1 | 11/2003 | Noriega et al. | |
| 2004/0019571 A1 | 1/2004 | Hurwitz et al. | |
| 2004/0128392 A1 | 7/2004 | Blakley et al. | |
| 2004/0162786 A1 | 8/2004 | Cross et al. | |
| 2004/0199475 A1 | 10/2004 | Rivest et al. | |
| 2005/0135240 A1 | 6/2005 | Ozugur | |
| 2005/0229005 A1 | 10/2005 | Le Saint et al. | |
| 2005/0247777 A1 | 11/2005 | Pitroda | |
| 2005/0247797 A1 | 11/2005 | Ramachandran | |
| 2005/0289080 A1 | 12/2005 | Rhiando | |
| 2006/0200424 A1 | 9/2006 | Cameron et al. | |
| 2007/0016484 A1 | 1/2007 | Waters et al. | |
| 2007/0016943 A1 | 1/2007 | M'Raihl et al. | |
| 2007/0043651 A1 | 2/2007 | Xiao et al. | |
| 2007/0118449 A1 | 5/2007 | De La Motte | |
| 2007/0192245 A1 | 8/2007 | Fisher et al. | |
| 2007/0203852 A1 | 8/2007 | Cameron et al. | |
| 2007/0204168 A1 | 8/2007 | Cameron et al. | |
| 2007/0204325 A1 | 8/2007 | Cameron et al. | |
| 2007/0214429 A1 | 9/2007 | Lyudovyk et al. | |
| 2007/0282951 A1* | 12/2007 | Selimis et al. | 709/205 |
| 2007/0294431 A1 | 12/2007 | Adelman et al. | |
| 2008/0010675 A1* | 1/2008 | Massascusa et al. | 726/9 |
| 2008/0071808 A1 | 3/2008 | Hardt et al. | |
| 2008/0098228 A1* | 4/2008 | Anderson et al. | 713/172 |
| 2008/0140576 A1 | 6/2008 | Lewis et al. | |
| 2008/0141366 A1 | 6/2008 | Cross et al. | |
| 2008/0162297 A1 | 7/2008 | Hershkovitz et al. | |
| 2008/0178271 A1 | 7/2008 | Galjjala et al. | |
| 2008/0178272 A1* | 7/2008 | Gajjala et al. | 726/6 |
| 2008/0184339 A1* | 7/2008 | Shewchuk et al. | 726/3 |
| 2008/0189778 A1 | 8/2008 | Rowley | |
| 2008/0196096 A1 | 8/2008 | Grynberg | |
| 2008/0229410 A1 | 9/2008 | Felsted et al. | |
| 2008/0235144 A1 | 9/2008 | Phillips | |
| 2008/0244722 A1 | 10/2008 | Satish et al. | |
| 2008/0256594 A1 | 10/2008 | Satish et al. | |
| 2008/0288404 A1* | 11/2008 | Pirzadeh et al. | 705/44 |
| 2008/0289020 A1* | 11/2008 | Cameron et al. | 726/9 |
| 2008/0313567 A1 | 12/2008 | Sabin et al. | |
| 2009/0037920 A1 | 2/2009 | Brown et al. | |
| 2009/0077118 A1 | 3/2009 | Doman et al. | |
| 2009/0077627 A1 | 3/2009 | Doman et al. | |
| 2009/0089870 A1* | 4/2009 | Wahl | 726/9 |
| 2009/0099860 A1* | 4/2009 | Karabulut et al. | 705/1 |
| 2009/0125558 A1 | 5/2009 | Suh | |
| 2009/0138398 A1 | 5/2009 | Cole et al. | |
| 2009/0178112 A1 | 7/2009 | Doman et al. | |
| 2009/0204622 A1 | 8/2009 | Sanders et al. | |
| 2009/0205014 A1 | 8/2009 | Doman et al. | |
| 2009/0205035 A1 | 8/2009 | Sermersheim et al. | |
| 2009/0216666 A1 | 8/2009 | Antao et al. | |
| 2009/0241178 A1 | 9/2009 | Burch et al. | |
| 2009/0249430 A1 | 10/2009 | Buss et al. | |
| 2009/0254476 A1 | 10/2009 | Sharma et al. | |
| 2009/0254483 A1 | 10/2009 | Barkan | |
| 2009/0260064 A1 | 10/2009 | McDowell et al. | |
| 2009/0300512 A1* | 12/2009 | Ahn | 715/747 |
| 2009/0300714 A1* | 12/2009 | Ahn | 726/1 |
| 2009/0300747 A1* | 12/2009 | Ahn | 726/9 |
| 2009/0319795 A1* | 12/2009 | Sharif et al. | 713/176 |
| 2009/0328166 A1 | 12/2009 | Burch et al. | |

FOREIGN PATENT DOCUMENTS

| | | |
|---|---|---|
| JP | 11039540 | 2/1999 |
| JP | 11154260 | 6/1999 |
| WO | WO98/23062 | 5/1998 |
| WO | WO2008/088945 | 7/2008 |

OTHER PUBLICATIONS

Cameron, Kim et al; "Design Rationale behind the Identity Metasystem Architecture"; http://www.identityblog.com/, http://research.microsoft.com/~mbj/; Mar. 16, 2006, pp. 1-11.

Chappell, David; "Introducing Windows CardSpace"; Windows Vista Technical Articles, http://msdn2.microsoft.com/en-us/library/aa480189(d=printer).aspx, Apr. 2006, pp. 1-15.

Gralla, Preston; "How the Internet Works"; Millennium Ed. Que, Aug. 1999.

The Higgins Foundation; "Higgins FAQ"; http://www.eclipse.org/higgins/faq.php; printed Aug. 13, 2007; pp. 1-2.

Hoang et al.; "Secure Roaming with Identity Metasystems"; ACM 978-1-60558-006-1; http://portal.acm.org/citation.cfm?id=1373297; 2008, pp. 36-47.

"Components—Eclipsepedia"; http://wiki.eclipse.org/Components; printed Aug. 13, 2007; pp. 1-8.

"Architecture—Eclipsepedia"; http://wiki.eclipse.org/index.php/Architecture; printed Aug. 13, 2007; pp. 1-2.

U.S. Appl. No. 11/395,725, filed Mar. 31,2006, entitled "Methods and Systems for Multi-Factor Authentication"; This is a commonly owned application that is in the same general field as the invention.

"The Resource STS: R-STS, RP-STS, A-STS . . . the other face of token issuing"; Vibro.NET; http://209.85.175.104/search?q=cache:mFlf-sZFBLsJ:blogs.msdn.comlvbertocci/arch ive/2007/09/24/the-resource-sts-r-sts-rp-sts-a-sts-the- other-face-of-token-issuing.aspx+microsoft+age+STS+RP&hl=en&ct=clnk&cd=2&gl=us&client=firefox-a; MSDN Blogs; 2007, pp. 1-7.

"Identity Selector Interoperability Profile specification and companion guides"; Microsoft Download Center; http://www.microsoft.com/downloads/details.aspx?DisplayLang=en&FamilyID=b94817fc-3991-4ddO-8e85-b73e626f6764; Microsoft Corporation; 2007.

Nanda, Arun; Identity Selector Interoperability Profile V1.0; Microsoft Download Center, http://download.microsoft. com/down load/1/1/a/11 ac6505-e4cO-4e05-987c-6f1 d31855cd2/Identity-Selector-Interop-Profile-v1 .pdf; Microsoft Corporation; Apr. 2007, pp. 1-52.

Microsoft Corporation, Ping Identity Corporation, "An Implementer's Guide to the Identity Selector Interoperability Profile V1.0"; Microsoft Download Center, http://download.microsoft.com/download/1/1/a/11ac6505-e4cO-4e05-987c-6f1 d31855cd2/Identity-Selector-Interop-Profile-v1-Guide.pdf; Microsoft Corporation; Apr. 2007, pp. 1-74.

Microsoft Corporation, "Microsofts Vision for an Identity Metasystem" http://msdn.microsoft.com/en-us/library/ms996422.aspx, May 2005, pp. 1-7.

(56) References Cited

OTHER PUBLICATIONS

Jones, Michael B.; "A Guide to Using the Indentity Selector interoperability Profile V1.0 within Web Applications and Browsers"; Microsoft Download Center; http://download.microsoft.com/download/1/1/a/11ac6505-e4c0-4e05-987c-6f1 d31855cd2/Identity-Selector-Interop-Profile-v1-Web-Guide.pdf; Microsoft Corporation; Apr. 2007, pp. 1-14.

Jones, Michael B., "Michael B. Jones Homepage"; http://research.microsoft.com/en-us/um-people/mbj; Aug. 12, 2009, pp. 1-4.

Jones, Michael B., "Mike Jones: self-issued"; http://research.microsoft.com/en-us/um-people/mbj; Aug. 12, 2009, pp. 1-45.

Just, Mike; "Designing Authentication Systems with Challenge Questions"; Security and Usability, Lorrie Faith Cranor and Simson Garfinkel (eds.); O'Reilly Media, Inc., Sebastopol, CA; Aug. 5,2005; Chapter 8, pp. 147-160.

"PwdHash From Stanford—Generate Passwords by Hashing the URL"; Don't Learn to Hack—Hack to LEARN, http://www.darknet.org.uk/2007/03/pwdhash-from-stanford-generate; Darknet; Mar. 13, 2007, pp. 1-8.

"Microsoft's Vision for an Identity Metasystem"; http://www.identityblog.com/stories/2005/07/05/IdentityMetasystem.htm; Microsoft Corporation; May 2005, pp. 1-10.

Gnucitizen, "Attacking Password Recovery Facilities"; http://www/gnucitizen.org/blog/attacking-password-recovery-facilities; Jul. 6, 2007, pp. 1-4.

Sol, S., "The Display (GUI) Layer" Intro to the Web Application Development Environment, http://web.archive.org/web/20001119171800/http://extropia.com/tutorials/devenv/gui.html>, Nov. 19, 2000, pp. 1-10, XP002517142.

Cambridge, "Cambridge Dictionary Online", Internet Article, http://dictionary.cambridge.org/define.asp?key=11419&dict=CALD>, Feb. 26, 2009, XP002517143.

Harjanto, A., "InfoCard and Browser Integration", Internet Article, http://blogs.msdn.com/andyhar/archive/2006/02/20/535333.aspx>, Feb. 20, 2006, XP002517147.

Nagarkar, V., "How to Drag Drop in javascript (Part I)", Internet Article, http://www.codeproject.com/KB/scripting/DragDrip_Part_1_.aspx, Jun. 11, 2006 (12 pages).

Dingle, P., "Identity Selectors & Browser Detection", Internet Article, http://eternallyoptimistic.com/2006/11/05/identity-selectors-browser-detection/>, Nov. 5, 2006, XP002517148.

Techtree News Staff, "Infocard Spells End of Passwords", Internet Article, http://www.techtree.com/techtree/jsp/article.jsp?print=1&article_id=71396&cat_id=582>, Feb. 16, 2006, XP002517144.

Tewfiq El Maliki et al.; A Survey of User-centric Identity Management Technologies; Emerging Security Information Systems, and Technologies, 2007, pp. 12-17.

Sanders, T., "IBM/Novell unveil rival to Microsoft Infocard", Internet Article, http://www.vnunet.com/articles/print/2151060>, Feb. 26, 2006, 29 XP002517145.

Cameron, K., "Bill Gates, Inforcards and the Identity Metasystem", Internet Article, http://www.identityblog.com/?p=374>, Feb. 19, 2006, XP002517146.

Darknet (2007), "Don't Learn to Hack—Hack to Learn". Retrieved from http://www.darknet.org.uk/2007/03/pwdhash-from-stanford-generate-passwords-by-hashing-the-url, pp. 1-7.

Allan, A. (2003), "Best Practices for Managing Passwords: Self-Service Q&A". Published by Garner, Inc. at Tutorials, TU-20-2040, pp. 1-5.

Microsoft Corporation, Ping Identity Corporation (Aug. 2005), "A Guide to Integrating with InfoCard v1.0", XP007908505, pp. 1-62.

Waleed et al., "Addressing privacy issues in CardSpace", 2007, IEEE, pp. 285-291.

\* cited by examiner

SYSTEM AND METHOD FOR VIRTUAL INFORMATION CARDS

RELATED APPLICATION DATA

This application is related to U.S. patent application Ser. No. 11/843,572, titled "PERFORMING A BUSINESS TRANSACTION WITHOUT DISCLOSING SENSITIVE IDENTITY INFORMATION TO A RELYING PARTY", filed Aug. 22, 2007, U.S. patent application Ser. No. 11/843,638, titled "POLICY-BASED AUDITING OF IDENTITY CREDENTIAL DISCLOSURE BY A SECURE TOKEN SERVICE", filed Aug. 22, 2007, and U.S. patent application Ser. No. 11/843,640, titled "FRAMEWORK AND TECHNOLOGY TO ENABLE THE PORTABILITY OF INFORMATION CARDS", filed Aug. 22, 2007, all of which are herein incorporated by reference for all purposes and all of which claim the benefit of U.S. Provisional Patent Application Ser. No. 60/895,312, filed Mar. 16, 2007, U.S. Provisional Patent Application Ser. No. 60/895,316, filed Mar. 16, 2007, and U.S. Provisional Patent Application Ser. No. 60/895,325, filed Mar. 16, 2007, all of which are herein incorporated by reference for all purposes.

This application is also related to U.S. patent application Ser. No. 12/019,104, titled "PROCESSING HTML EXTENSIONS TO ENABLE SUPPORT OF INFORMATION CARDS BY A RELYING PARTY", filed Jan. 24, 2008, which claims the benefit of U.S. Provisional Patent Application Ser. No. 60/973,679, filed Sep. 19, 2007, both of which are herein incorporated by reference for all purposes.

This application is also related to U.S. patent application Ser. No. 11/843,591, titled "CREDENTIAL CATEGORIZATION", filed Aug. 22, 2007, U.S. patent application Ser. No. 11/843,608, titled "CHAINING INFORMATION CARD SELECTORS", filed Aug. 22, 2007, U.S. patent application Ser. No. 12/026,775, titled "METHODS FOR SETTING AND CHANGING THE USER CREDENTIAL IN INFORMATION CARDS", filed Feb. 6, 2008, U.S. patent application Ser. No. 12/029,373, titled "VISUAL AND NON-VISUAL CUES FOR CONVEYING STATE OF INFORMATION CARDS, ELECTRONIC WALLETS, AND KEYRINGS", filed Feb. 11, 2008, U.S. patent application Ser. No. 12/030,363, titled "INFO CARD SELECTOR RECEPTION OF IDENTITY PROVIDER BASED DATA PERTAINING TO INFO CARDS", filed Feb. 12, 2008, U.S. patent application Ser. No. 12/038,674, titled "SYSTEM AND METHOD FOR SECURE ACCOUNT RESET UTILIZING INFORMATION CARDS", filed Feb. 27, 2008, U.S. patent application Ser. No. 12/042,205, titled "PRIVATELY SHARING RELYING PARTY REPUTATION WITH INFORMATION CARD SELECTORS", filed Mar. 4, 2008, U.S. patent application Ser. No. 12/044,816, titled "SYSTEM AND METHOD FOR USING WORKFLOWS WITH INFORMATION CARDS", filed Mar. 7, 2008, U.S. patent application Ser. No. 12/054,137, titled "CARDSPACE HISTORY VALIDATOR", filed Mar. 24, 2009, U.S. patent application Ser. No. 12/054,774, titled "CLAIM CATEGORY HANDLING", filed Mar. 25, 2008, U.S. patent application Ser. No. 12/108,805, titled "RESTRICTED USE INFORMATION CARDS", filed Apr. 24, 2008, U.S. patent application Ser. No. 12/111,874, titled "REMOTABLE INFORMATION CARDS", filed Apr. 29, 2008, U.S. patent application Ser. No. 12/112,772, titled "DYNAMIC INFORMATION CARD RENDERING", filed Apr. 30, 2008, U.S. patent application Ser. No. 12/170,384, titled "NON-INTERACTIVE INFORMATION CARD TOKEN GENERATION", filed Jul. 9, 2008, and U.S. patent application Ser. No. 12/184,155, titled "SITE-SPECIFIC CREDENTIAL GENERATION USING INFORMATION CARDS", filed Jul. 31, 2008, all of which are herein incorporated by reference for all purposes.

FIELD OF THE INVENTION

This invention pertains to using information cards, and more particularly to interacting with a relying party without having an information card that can satisfy the relying party's security policy.

BACKGROUND OF THE INVENTION

When a user interacts with sites on the Internet (hereafter referred to as "service providers" or "relying parties"), the service provider often expects to know something about the user that is requesting the services of the provider. The typical approach for a service provider is to require the user to log into or authenticate to the service provider's computer system. But this approach, while satisfactory for the service provider, is less than ideal to the user. First, the user must remember a username and password for each service provider who expects such information. Given that different computer systems impose different requirements, and the possibility that another user might have chosen the same username, the user might be unable to use the same username/password combination on each such computer system. (There is also the related problem that if the user uses the same username/password combination on multiple computer systems, someone who hacks one such computer system would be able to access other such computer systems.) Second, the user has no control over how the service provider uses the information it stores. If the service provider uses the stored information in a way the user does not want, the user has relatively little ability to prevent such abuse, or recourse after the fact.

To address this problem, new systems have been developed that allow the user a measure of control over the information stored about the user. Windows CardSpace™ (sometimes called CardSpace) is a Microsoft implementation of an identity meta-system that offers a solution to this problem. (Microsoft, Windows, and CardSpace are either registered trademarks or trademarks of Microsoft Corporation in the United States and/or other countries.) A user can store identity information with an identity provider the user trusts. When a service provider wants some information about the user, the user can control the release of information stored with the identity provider to the service provider. The user can then use the offered services that required the identity information.

While this system simplifies the management of information used to satisfy the requests of service providers, there are potential problems. For the system to operate, the user needs to have an information card on his or her system that can provide all of the information requested by the relying party. If the relying party requests information that cannot be satisfied by any one information card on the user's machine, the system breaks down. This situation can occur, for example, if the relying party requests a combination of information not previously requested, and for which the user might not have yet set up an information card. Another way in which this situation can occur is if the user is new to the system, and has yet to set up any information cards at all.

A need remains for a way to address these and other problems associated with the prior art.

SUMMARY OF THE INVENTION

In an embodiment of the invention, a client includes a card selector, a receiver, and a transmitter. Upon receipt of a security policy from a relying party, the client can determine whether any installed information card can satisfy the security policy. If no information card satisfies the security policy (which can occur, for example, if no information card is yet installed), the client can define a virtual information card, which can be used to generate a security token that can be transmitted to the relying party.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
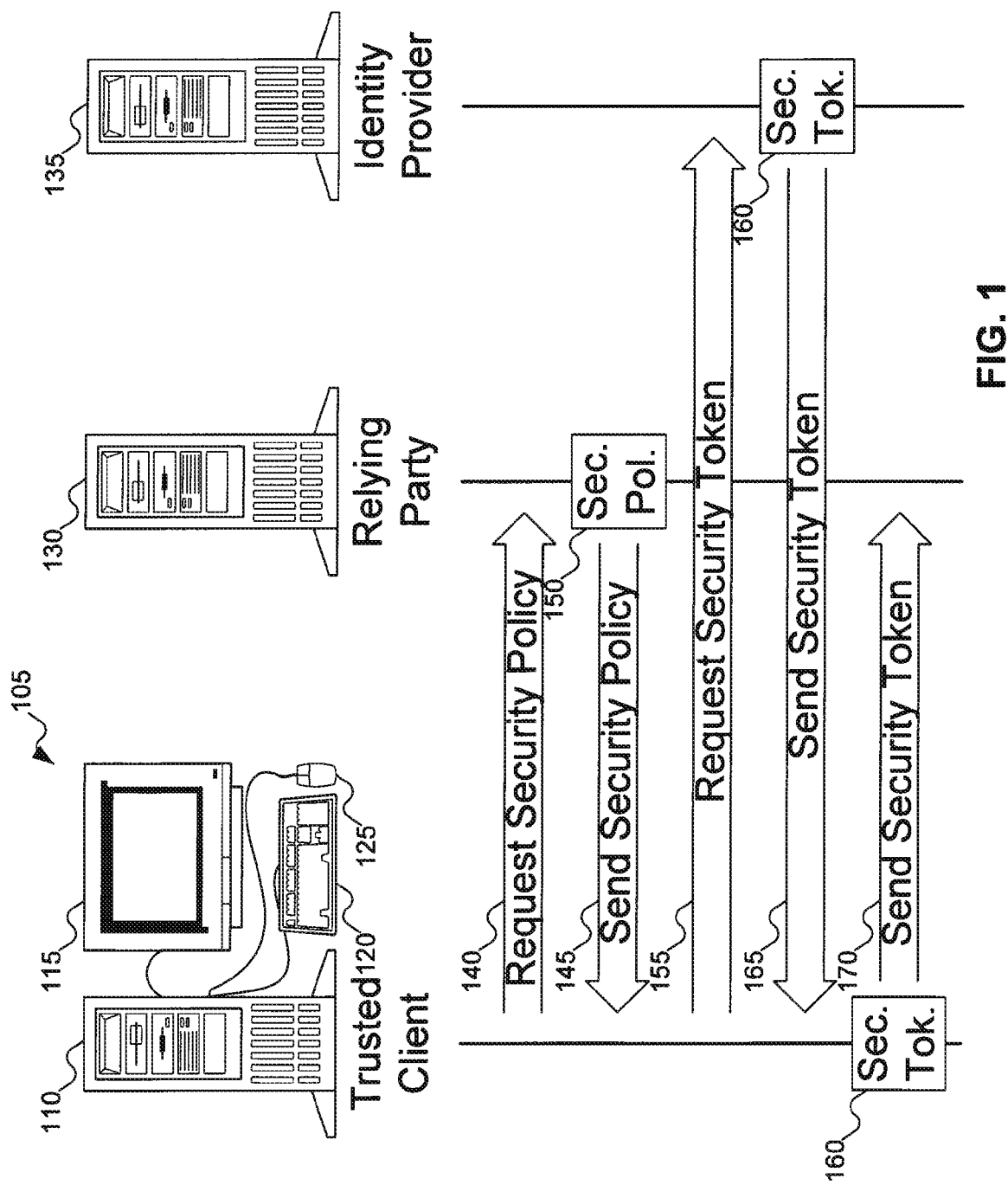
FIG. 1 shows a sequence of communications between a client, a relying party, and an identity provider.

Before explaining the invention, it is important to understand the context of the invention. FIG. 1 shows a sequence of communications between a client, a relying party, and an identity provider. For simplicity, each party (the client, the relying party, and the identity provider) can be referred to by their machines. Actions attributed to each party are taken by that party's machine, except where the context indicates the actions are taken by the actual party.

In FIG. 1, computer system 105, the client, is shown as including computer 110, monitor 115, keyboard 120, and mouse 125. A person skilled in the art will recognize that other components can be included with computer system 105: for example, other input/output devices, such as a printer. In addition, FIG. 1 does not show some of the conventional internal components of computer system 105: for example, a central processing unit, memory, storage, etc. Although not shown in FIG. 1, a person skilled in the art will recognize that computer system 105 can interact with other computer systems, such as relying party 130 and identity provider 135, either directly or over a network (not shown in FIG. 1) of any type. Finally, although FIG. 1 shows computer system 105 as a conventional desktop computer, a person skilled in the art will recognize that computer system 105 can be any type of machine or computing device capable of providing the services attributed herein to computer system 105, including, for example, a laptop computer, a personal digital assistant (PDA), or a cellular telephone.

Relying party 130 is a machine managed by a party that relies in some way on the identity of the user of computer system 105. The operator of relying party 130 can be any type of relying party. For example, the operator of relying party 130 can be a merchant running a business on a website. Or, the operator of relying party 130 can be an entity that offers assistance on some matter to registered parties. Relying party 130 is so named because it relies on establishing some identifying information about the user.

Identity provider 135, on the other hand, is managed by a party responsible for providing identity information (or other such information) about the user for consumption by the relying party. Depending on the type of information identity provider 135 stores for a user, a single user might store identifying information with a number of different identity providers 135, any of which might be able to satisfy the request of the relying party. For example, identity provider 135 might be a governmental agency, responsible for storing information generated by the government, such as a driver's license number or a social security number. Or, identity provider 135 might be a third party that is in the business of managing identity information on behalf of users.

The conventional methodology of releasing identity information can be found in a number of sources. One such source is Microsoft Corporation, which has published a document entitled Introducing Windows CardSpace, which can be found on the World Wide Web at http://msdn2.microsoft.com/en-us/library/aa480189.aspx and is hereby incorporated by reference. To summarize the operation of Windows CardSpace, when a user wants to access some data from relying party 130, computer system 105 requests the security policy of relying party 130, as shown in communication 140, which is returned in communication 145 as security policy 150. Security policy 150 is a summary of the information relying party 130 needs, how the information should be formatted, and so on.

Once computer system 105 has security policy 150, computer system 105 can identify which information cards will satisfy security policy 150. Different security policies might result in different information cards being usable. For example, if relying party 130 simply needs a user's e-mail address, the information cards that will satisfy this security policy will be different from the information cards that satisfy a security policy requesting the user's full name, mailing address, and social security number. The user can then select an information card that satisfies security policy 150.

Once the user has selected an acceptable information card, computer system 105 uses the selected information card to transmit a request for a security token from identity provider 135, as shown in communication 155. This request can identify the data to be included in the security token, the credential that identifies the user, and other data the identity provider needs to generate the security token. Identity provider 135 returns security token 160, as shown in communication 165. Security token 160 includes a number of claims, or pieces of information, that include the data the user wants to release to the relying party. Security token 160 is usually encrypted in some manner, and perhaps signed and/or time-stamped by identity provider 135, so that relying party 130 can be certain that the security token originated with identity provider 135 (as opposed to being spoofed by someone intent on defrauding relying party 130). Computer system 105 then forwards security token 160 to relying party 130, as shown in communication 170.

In addition, the selected information card can be a self-issued information card: that is, an information card issued not by an identity provider, but by computer system 105 itself. In that case, identity provider 135 effectively becomes part of computer system 105, and computer system 105 generates security token 160.

In this model, a person skilled in the art will recognize that because all information flows through computer system 105, the user has a measure of control over the release of the user's identity information. Relying party 130 only receives the information the user wants relying party 130 to have, and does not store that information on behalf of the user (although it would be possible for relying party 130 to store the information in security token 160: there is no effective way to prevent such an act).

The problem with this model is, as noted above, that there is an implicit assumption that client 105 includes an information card that can satisfy security policy 150. If no such information card exists, as can happen if no information card has yet been added to client 105 or if no individual information card includes all of the claims requested by in security policy 150, then the user will not be able to use the system to produce security token 160. And without security token 160, the user might not be able to access the desired resource on relying party 130.

Figure 2:
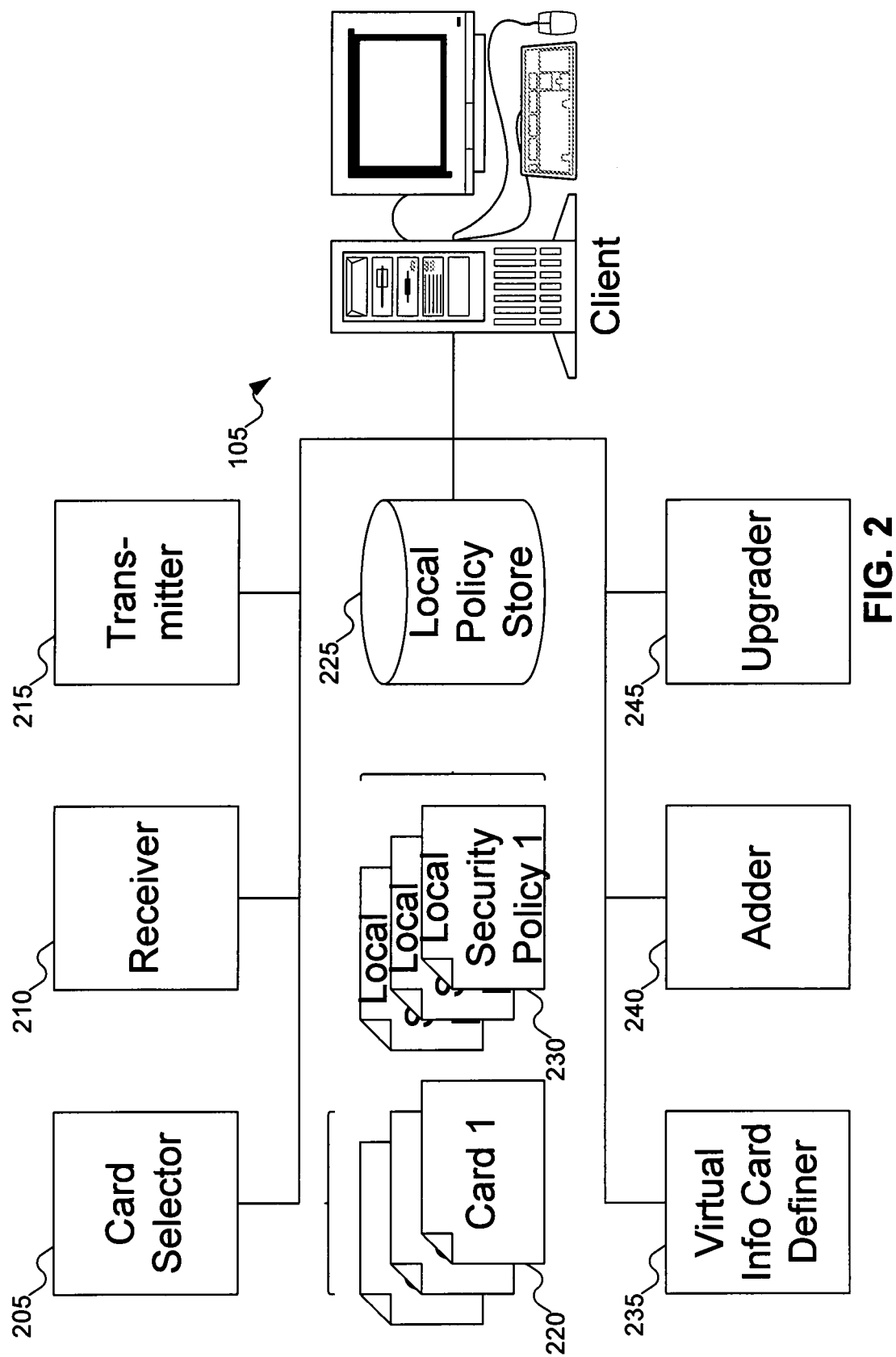
FIG. 2 shows the client of FIG. 1 equipped to use virtual information cards, according to an embodiment of the invention.

Now that the problem—removing the assumption that client 105 stores an information card that can satisfy security policy 150—is understood, embodiments of the invention can be explained. FIG. 2 shows the client of FIG. 1 equipped to use virtual information cards, according to an embodiment of the invention. In FIG. 2, client 105 includes card selector 205, receiver 210, and transmitter 215. Card selector 205 enables the user of the client to select a desired information card, such as information card 220, to use in a particular transaction. As discussed above, information card 220 can be a personal information card, where all the information is provided by the user and is locally asserted to be valid, or a managed information card, where the information is stored on an identity provider and is asserted to be valid by the identity provider. Receiver 210 and transmitter 215 enable communications to and from the client.

Client 105 can also include local policy store 225, which can store local security policies, such as local security policy 230. Local security policy 230 can also be called a virtual information card policy. Local security policy 230 can be a local security policy defining how virtual information cards can be defined and used. Local security policy 230 is discussed further with reference to FIG. 7 below.

Client 105 can also include virtual information card definer 235, adder 240, and upgrader 245. Virtual information card definer 235 can define a virtual information card that can be used to satisfy a security policy from a relying party. Adder 240 can add a virtual information card to client 105 based on the definitions in virtual information card definer 235 as a new information card. Upgrader 245 can upgrade an existing information card on client 105 to include additional information based on the definitions in virtual information card definer 235. Virtual information card definer 235, adder 240, and upgrader 245 are discussed more with reference to FIGS. 3-5 below.

The discussion above, and FIG. 3 below, suggests that once a virtual information card has been defined by virtual information card definer 235, this newly-defined virtual information card can then be stored on client 105, and used as an information card in future transactions. In addition, the presence of information card 220 on client 105 can be used as a springboard for defining a new virtual information card using virtual information card definer 235. While these statements are correct, a person skilled in the art will recognize that neither of these statements is required: these statements do not represent requirements for embodiments of the invention to operate. For example, the virtual information card does not need to be stored on client 105. That is, the combination of virtual information card definer 235 and local security policy 230 can be used to define virtual information cards for all transactions, without any virtual information card ever being stored on client 105 as new information cards. Similarly, as discussed above, there might not be any information cards stored on client 105, in which case virtual information card definer 235 does not have an existing information card to augment and define a virtual information card.

Figure 3:
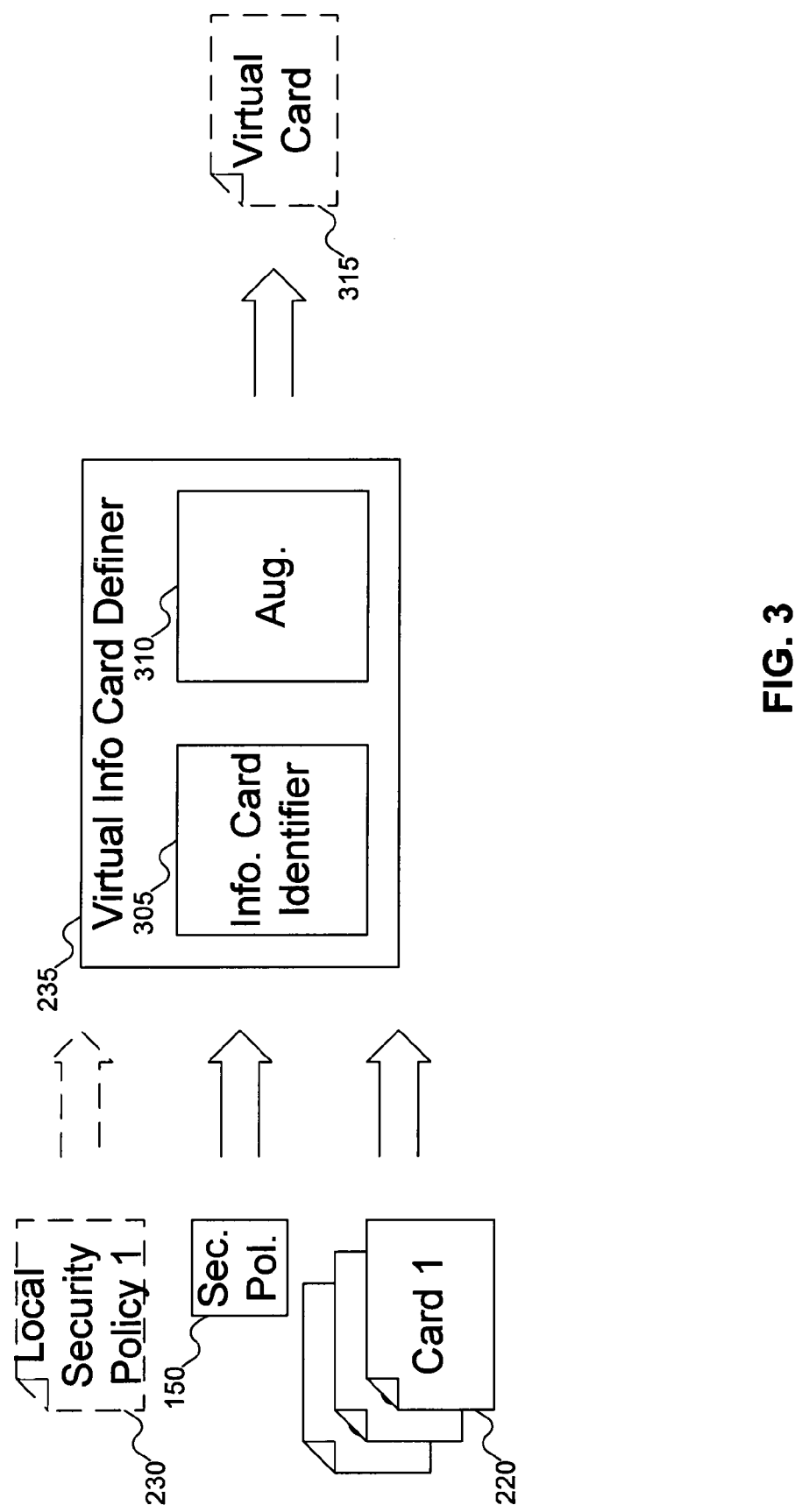
FIG. 3 shows more detail about the virtual information card definer of FIG. 2.

FIG. 3 shows more detail about the virtual information card definer of FIG. 2. In FIG. 3, virtual information card definer 235 takes as input available information cards 220, security policy 150, and local security policy 230 (if used). While FIG. 3 shows virtual information card definer 235 considering only one local security policy, a person skilled in the art will recognize that virtual information card definer 235 can use any number of local security policies.

Information card identifier 305 then identifies which information card 220, if any, comes closest to satisfying security policy 150. It may be that no information card 220 comes close to satisfying security policy 150. It also may be that there are multiple information cards 220 that come close to satisfying security policy 150.

Once an information card has been identified by information card identifier 305 as a near-match for the security policy, augmenter 310 augments the identified information card with the additional information needed to satisfy security policy 150. The result of this effort is virtual information card 315, which can satisfy security policy 150.

There are some circumstances in which the operation of virtual information card definer 235 might not seem obvious. The first is if there are no information cards 220 installed on the client. In this situation, then information card identifier 305 will be unable to identify a near-match information card. Virtual information card definer 235 can then define virtual information card 315 as including all the data requested in security policy 150.

Another circumstance in which the operation of virtual information card definer 235 might not be obvious is when local security policy 230 is used. As discussed above with reference to FIG. 2 and below with reference to FIG. 7, local security policy 230 defines limits under which virtual information card 315 can be defined. For example, local security policy 230 can require that virtual information card 315 be defined by augmenting an existing information card 220 that includes specific claims. This information can be used by information card identifier 305 to limit which information cards 220 are considered as acceptable bases for augmentation to virtual information card 315.

As discussed above with reference to FIGS. 2-3, it is possible for there to be no information cards installed on the client at the time the client receives a security policy from a relying party. It is also possible that no information card installed on the client satisfies the security policy, nor is any installed information card considered a sufficiently "near-match" to serve as the basis for augmentation. (This latter situation can occur, for example, if no information card includes any claims requested by the security policy, or if the local security policy requires that an information card include information that conflicts with that requested by the security policy.) In these situations, virtual information card definer 235 can define a virtual information card as including all the claims requested in the security policy (assuming that no local security policy prevents the definition of such a virtual information card). Assuming this virtual information card results in a security token that satisfies the relying party's security policy, this virtual information card can be added to the client as a proper information card. This process of adding the virtual information card to the client as a proper information card is accomplished using adder 240 of FIG. 2.

A point worth noting is that there is no guarantee that a virtual information card can be used to generate a security token. Specifically, the virtual information card might include information or methods not known to be available at the party generating the security token (which can be an identity provider, but could also be the local client). For example, consider a virtual information card that is based on an existing information card that includes everything requested by a relying party except the user's e-mail address. The virtual information card can add the e-mail address to the list of claims requested from the identity provider in the security token. But if the identity provider does not understand the e-mail address claim or does not know the user's e-mail address, the identity provider cannot include this claim in the security token, which means the security policy of the relying party would not be satisfied.

Figure 4:
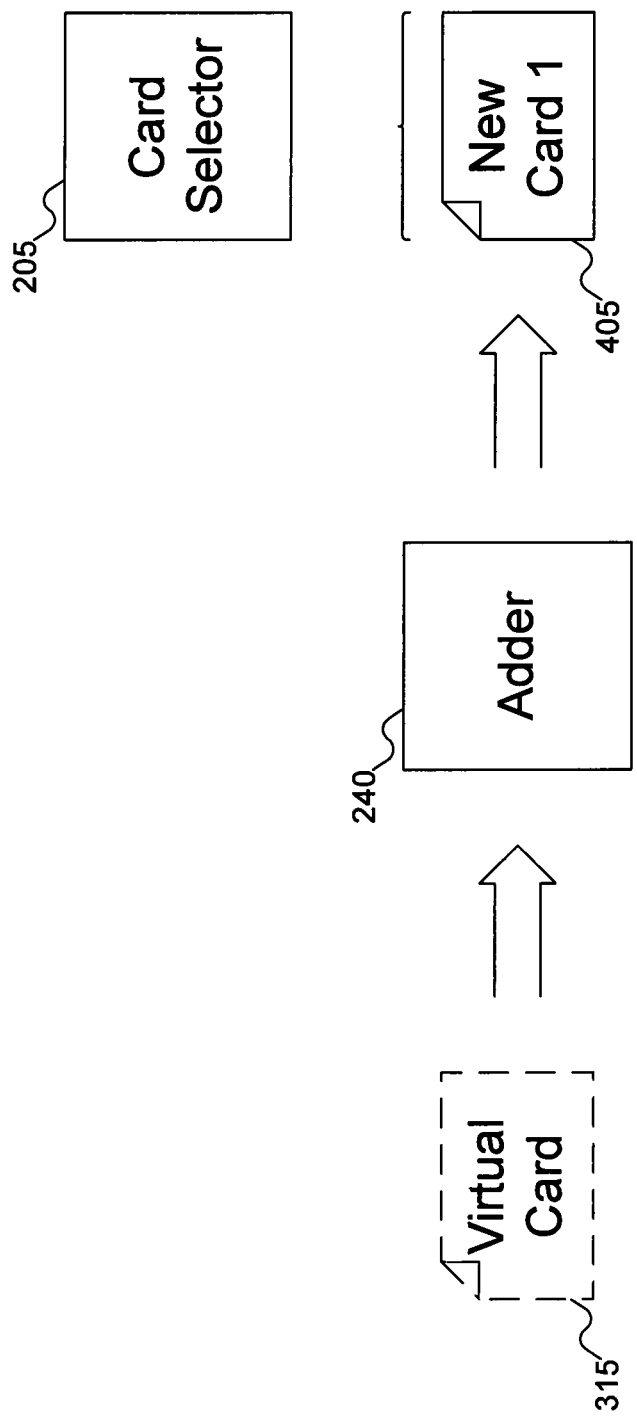
FIG. 4 shows more detail about the adder of FIG. 2.

FIG. 4 shows more detail about adder 240 of FIG. 2. In FIG. 4, adder 240 takes virtual information card 315 and adds it as new information card 405 to card selector 205 on the client. Once virtual information card 315 has been added to the client as information card 405, information card 405 is then available to be used to satisfy any security policies, or even to serve as the basis for augmentation to a new virtual information card (as discussed above with reference to FIG. 3).

As discussed above with reference to FIGS. 2-3, virtual information card definer 235 can augment an existing information card to satisfy a security policy, rather than defining a new virtual information card from scratch. Assuming the security token generated using the virtual information card satisfies the relying party's security policy, the differences between the originally selected information card and the virtual information card can be added to the information card, to "upgrade" that information card.

Figure 5:
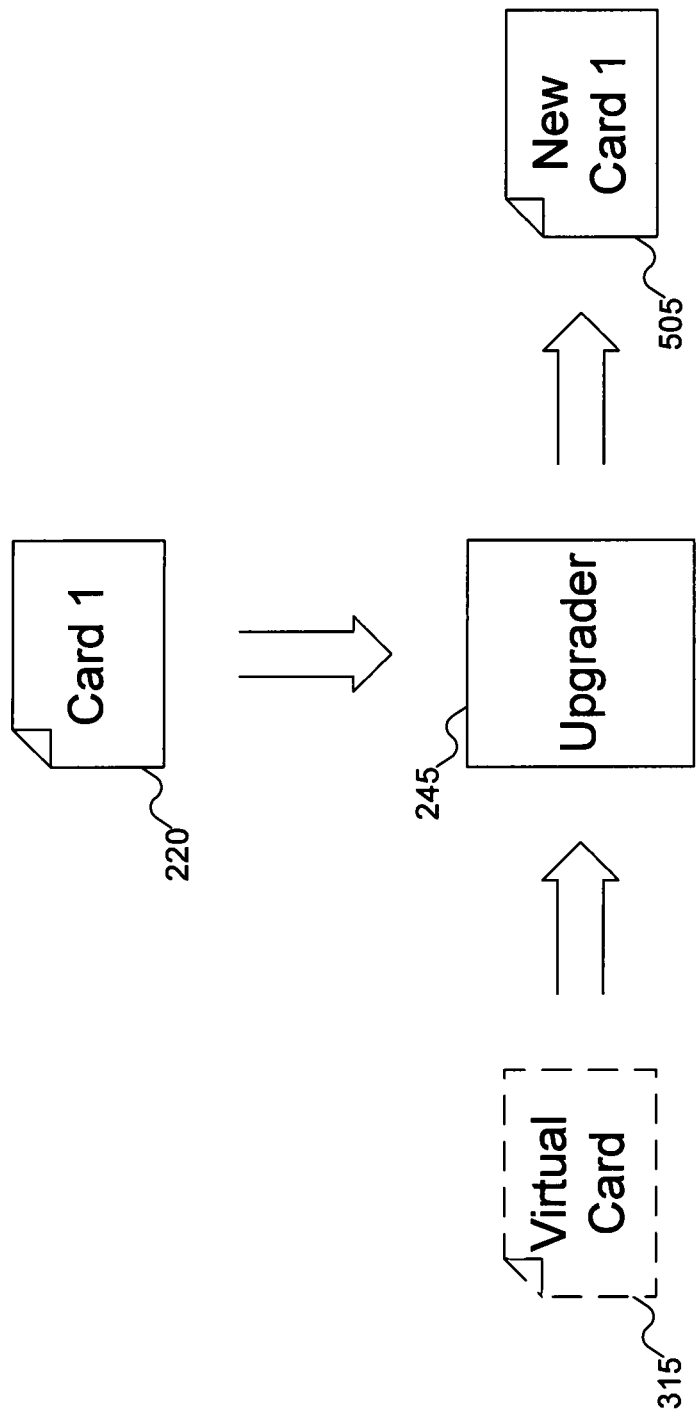
FIG. 5 shows more detail about the upgrader of FIG. 2.

FIG. 5 shows more detail about upgrader 245 of FIG. 2. In FIG. 5, upgrader 245 takes virtual information card 315 and identified information card 220. Upgrader 245 produces "new" information card 505, which is the upgraded form of information card 220, including all of the information originally in information card 220 along with the information added to virtual information card 315 by augmenter 310 (as shown in FIG. 3). "New" information card 505, which is the upgraded form of information card 220, can then be added to the client, replacing original information card 220. (Alternatively, "new" information card 505 can be added to the client without replacing original information card 220. It is worth noting that new information card 505 might or might not satisfy the same set of security policies satisfied by original information card 220.)

Figure 6:
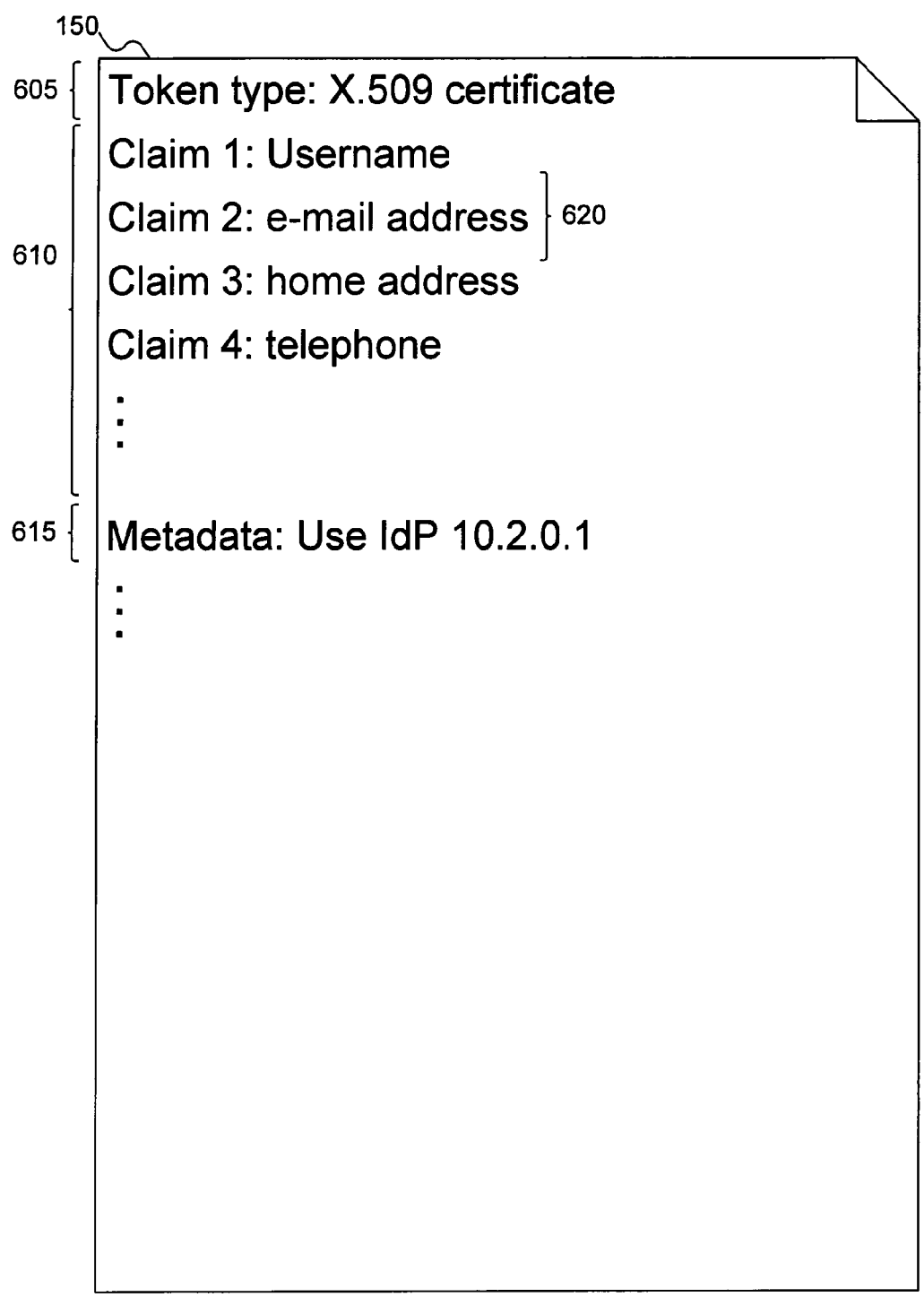
FIG. 6 shows details about information that can be included in the security policy of FIG. 1.

FIG. 6 shows details about information that can be included in the security policy of FIG. 1. In FIG. 6, security policy 150 is shown in greater detail. Among the things that can be requested in security policy 150 are particular token type 605, list of claims 610, and other metadata 615. If the relying party wants the security token to include a particular token type, such as a X.509 certificate, this can be specified as particular token type 605.

List of claims 610 lists the claims that are requested by the relying party. Relative to a particular information card, list of claims 610 can include one or more claims not included in the information card. For example, given a particular information card, the particular information card might include all claims in list of claims 610 except claim 620. While claim 620 is an example of a claim missing from the particular information card, a person skilled in the art will recognize that any information can be "missing" from the information card and needed for augmentation.

Security policy 150 can also request other metadata, which is limited only by what a relying party might reasonably request. For example, in FIG. 7, security policy 150 indicates that the relying party wants the security token to be issued by an identity provider with a particular IP address. A person skilled in the art will recognize that any other metadata can be requested by the relying party in security policy 150.

To the extent that no information card on the client can satisfy all the requested data in security policy 150, a virtual information card can be used to satisfy the security policy. Embodiments of the invention therefore enable responding to security policies even when any of the information requested in the security policy (such as token type 605, list of claims 610, or other metadata 615) might be missing from a potentially viable information card.

Figure 7:
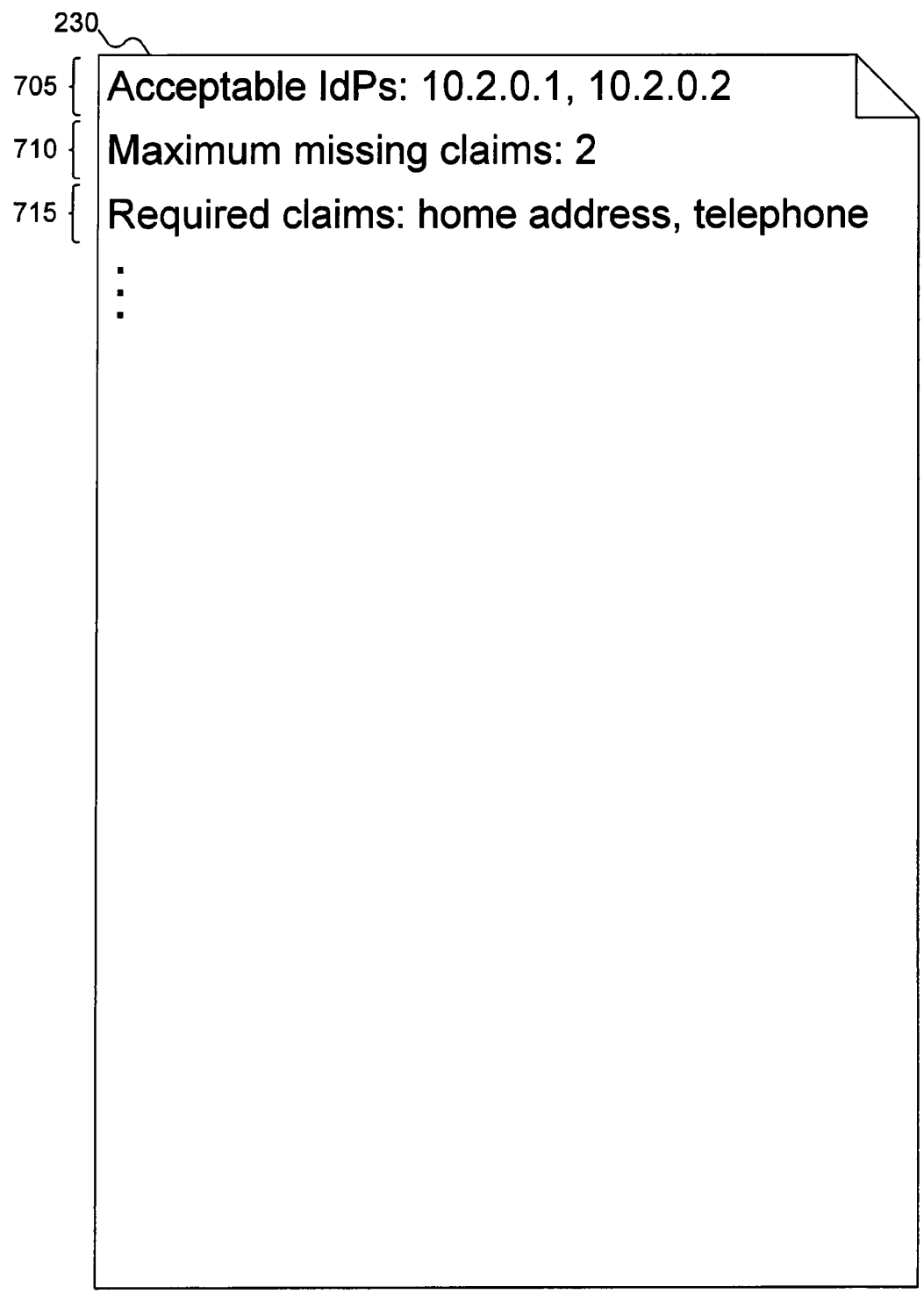
FIG. 7 shows details about the local security policy of FIG. 2.

As discussed above with reference to FIGS. 2-3, the client can include a local security policy, which can limit how and when a virtual information card can be used. FIG. 7 shows details about local security policy 230 of FIG. 2. In FIG. 7, local security policy 230 is shown as including three limitations. List 705 identifies identity providers that are acceptable in generating a security token. For example, as discussed above with reference to FIG. 6, the security policy can specify that a particular identity provider be used in generating the security token. But if the identity provider requested by the relying party happened to be untrustworthy, the use of that identity provider could be dangerous. For example, the identity provider might be known to release information that should not be released without the owner's consent. By including list 705 of acceptable identity providers, local security policy 230 can provide the user with some control over the use of virtual information cards. While FIG. 7 shows list 705 of acceptable identity providers as a white list (that is, a list of the only acceptable identity providers), a person skilled in the art will recognize that list 705 can be managed in other words: for example, as a black list, as a list of identity providers for which the user should be prompted before the security token is requested, or any combination of the above, among other possibilities.

If it turns out that local security policy 230 blocks the use of an identity provider that is requested by the security policy, the conflict can be resolved in any manner desired. In some embodiments of the invention, local security policy 230 can trump the security policy, thereby blocking the user from access to the requested resource, but protecting the user's information. In other embodiments of the invention, local security policy 230 can defer to the security policy, giving the user access to the requested resource at the cost of potentially giving up some control over the user's information. A person skilled in the art will recognize other ways in which conflicts between local security policy 230 and the security policy can be resolved: for example, by letting the user decide which policy should control.

Local security policy 230 can also include maximum number of missing claims 710. Maximum number of missing claims 710 indicates how far a particular information card can deviate from the security policy and still be used as a basis for a virtual information card. For example, with maximum number of missing claims set to 2 as shown in FIG. 7, if an information card is missing, say, five claims requested in the security policy, then the information card can be rejected as the basis for a virtual information card.

Local security policy 230 can also include required claims 715. Required claims 715 can be used to specify claims that the information card must have: these claims cannot be specified by augmentation. For example, in FIG. 7 the information card must include the home address and telephone number claims: if an information card does not include these claims, the information card cannot be used as the basis for a virtual information card. By specifying claims that must be included in the information card, the system can provide a greater probability that the identity provider can generate the security token.

While FIG. 7 shows a single local security policy, a person skilled in the art will recognize that there can be any number of local security policies. For example, the administrator of a local computer network can define a security policy applicable to all security tokens transmitted from the network, and the users of the network can define their own local security policies to add additional levels of security. If there are multiple local security policies, the client can access all applicable local security policies in defining a virtual information card.

While FIG. 7 shows only three limitations in local security policy 230, a person skilled in the art will recognize that there can be any number of limitations. For example, any of the limitations shown in FIG. 7 can be omitted, if not needed. Alternatively, if an administrator identifies other limitations beyond those shown in FIG. 7, these additional limitations can be included in local security policy 230. The criteria shown in FIG. 7 are merely exemplary criteria that can be included in local security policy 230; a person skilled in the art will recognize other criteria that can be used: for example, credential categorization (described in related U.S. patent application Ser. No. 11/843,591, titled "CREDENTIAL CATEGORIZATION", filed Aug. 22, 2007, and herein incorporated by reference for all purposes), token type, auditing mode (which permits an identity provider to know which relying party is requesting the security token), etc.

Figure 8A:
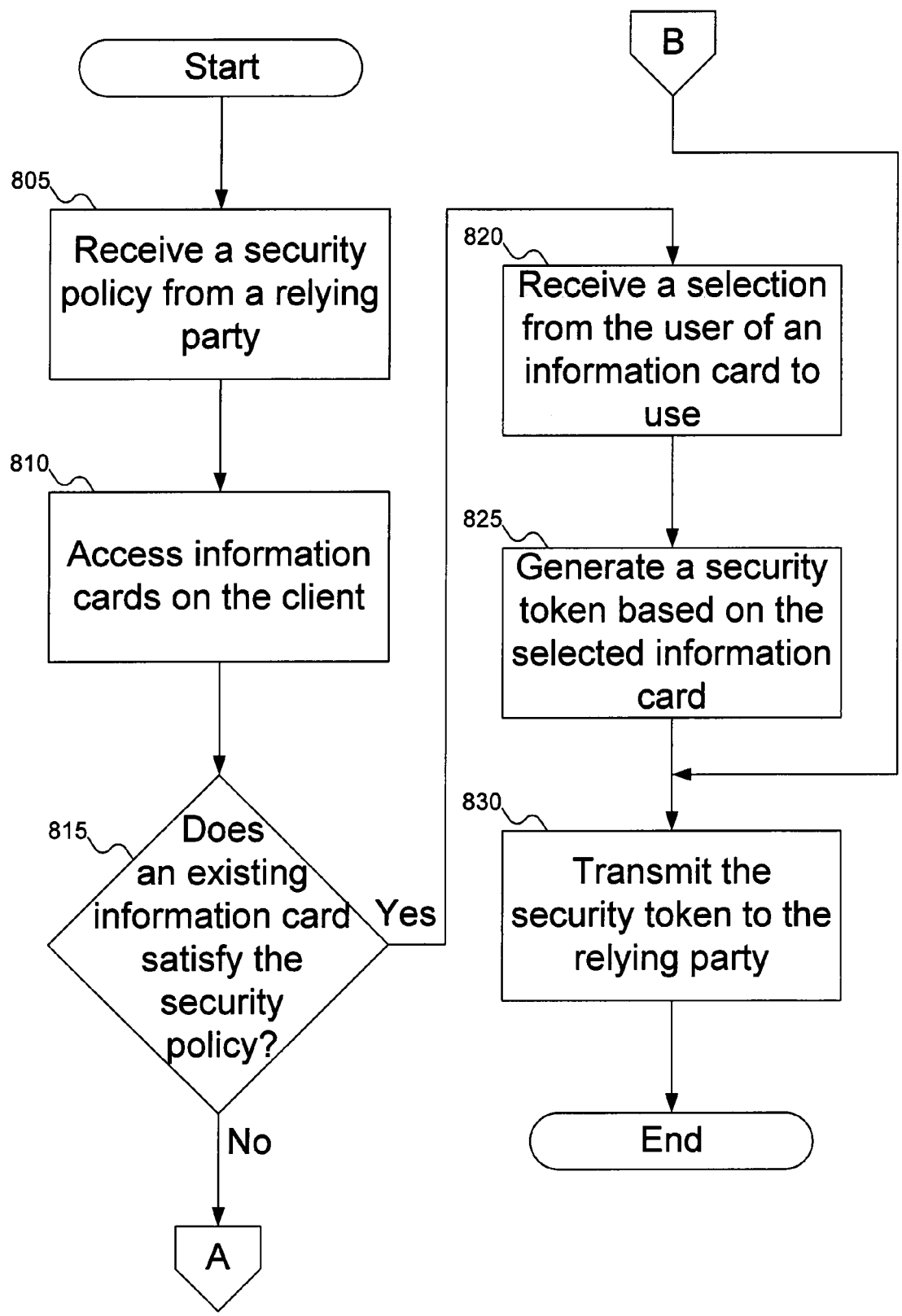
FIGS. 8A-8B show a flowchart of a procedure to use a virtual information card for use in the system of FIG. 1.
Figure 8B:
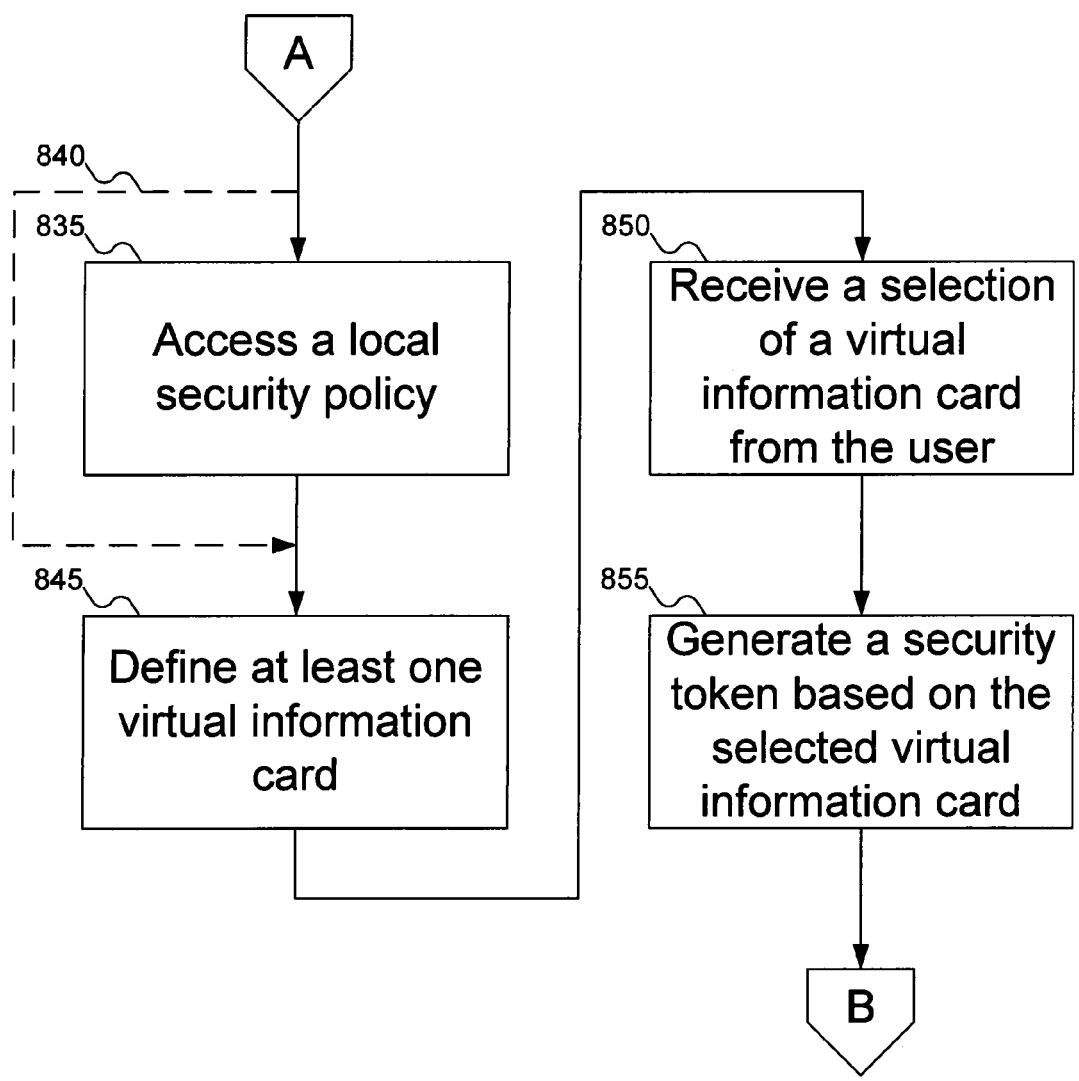

FIGS. 8A-8B show a flowchart of a procedure to use a virtual information card for use in the system of FIG. 1. In FIG. 8A, at block 805, the client receives a security policy from a relying party. At block 810, the client identifies available information cards. At block 815, the client determines whether an existing information card can satisfy the security policy. If one or more information cards can satisfy the security policy, then at block 820 the client receives the user's selection of an information card to use. At block 825, a security token is generated based on the selected information card, and at block 830, the client transmits the security token to the relying party.

If no existing information card can satisfy the security token, then at block 835 (FIG. 8B) the client accesses one or more local security policies. If there are no local security policies defined on the client or otherwise applicable, block 835 can be omitted, as shown by dashed arrow 840. At block 845, the client defines a virtual information card. If it turns out that there are different ways in which the virtual information card can be defined (for example, if there are multiple information cards that are "close enough" to the security policy, or if a virtual information card can be defined without reference to any information card as well as by augmenting an existing information card), more than one virtual information card can be defined. At block 850, the client receives from the user a selection of one of the virtual information cards. At block 855, a security token is generated based on the selected virtual information card. Processing then continues with block 830 on FIG. 8A.

Figure 9A:
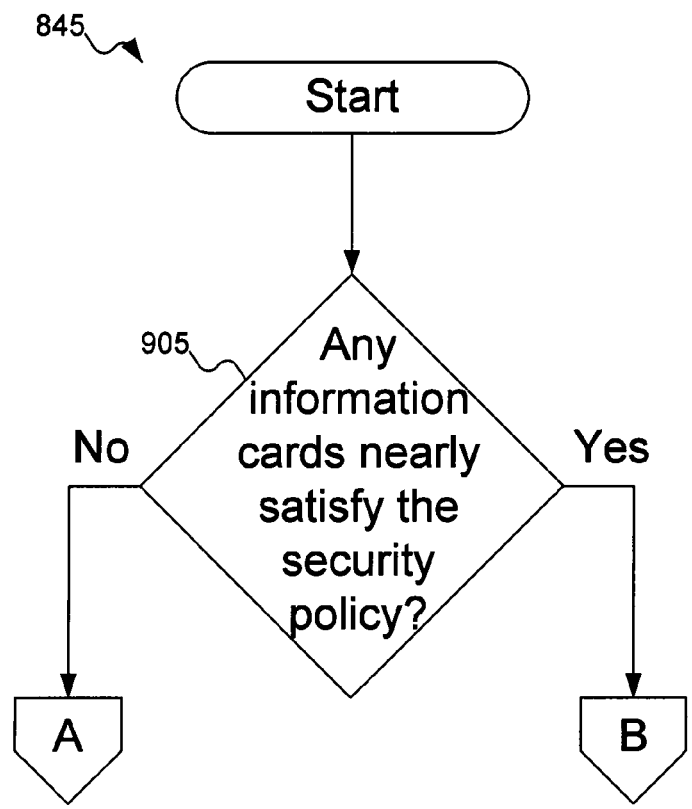
FIGS. 9A-9B show a flowchart of a procedure to produce a virtual information card in the system of FIG. 1.
Figure 9B:
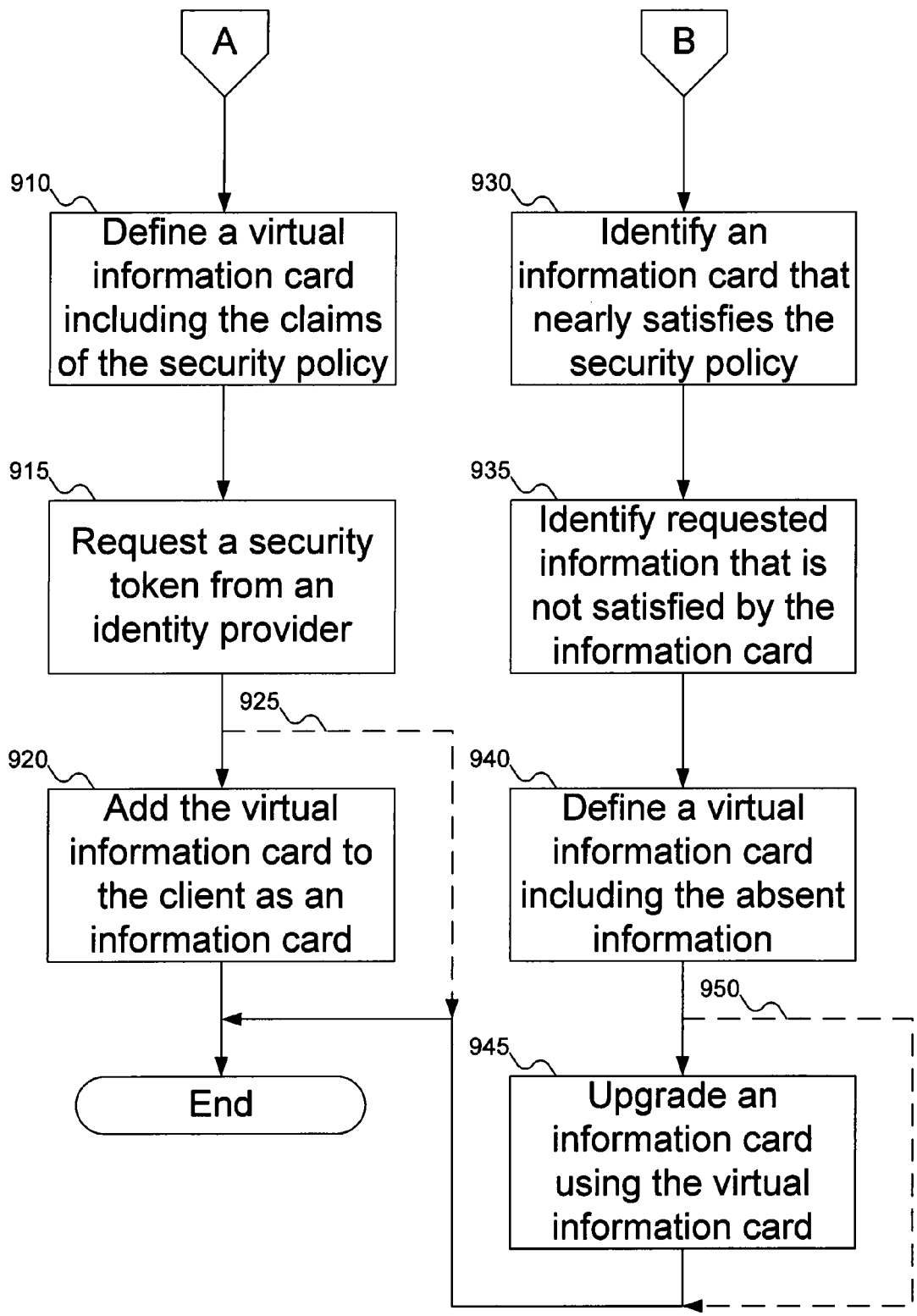

FIGS. 9A-9B show a flowchart of a procedure to produce a virtual information card in the system of FIG. 1. In FIG. 9A, at block 905, the client checks to see if there are any information cards on the client that nearly satisfy the security policy. If there are no installed information cards that nearly satisfy the security policy, then at block 910 (FIG. 9B) a virtual information card can be defined from the security policy, including the claims (and any other information) requested in the security policy. At block 915, the client can request a security token from an identity provider, and at block 920 the client can add the virtual information card as a new information card on the client. Block 920 can be omitted, as shown by dashed arrow 925. (A person skilled in the art will recognize that the client might only add the virtual information card as an information card on the client after the security token has been accepted by the relying party, in which there might be other activity and/or conditions to be met before the virtual information card is added as a new information card.)

On the other hand, if there are installed information cards on the client, then at block 930 the client identifies an information card that nearly satisfies the security policy. At block 935, the client identifies information requested in the security token but not satisfied by the information card. At block 940, the client defines a virtual information card based on the identified information card but also including the information requested in the security policy that is not satisfied by the information card. At block 945, the information card can be upgraded to include the information the information card did not satisfy. Block 945 can be omitted, as shown by dashed arrow 950. (A person skilled in the art will recognize that the client might only upgrade the information card on the client after the security token has been accepted by the relying party, in which there might be other activity and/or conditions to be met before the information card is upgraded.)

While FIGS. 9A-9B suggests that defining a virtual information card from the security policy and defining a virtual information card from an existing information card are separate options, a person skilled in the art will recognize that both branches can be taken in parallel. That is, even though there might be an information card that nearly satisfies the security policy, a virtual information card might be defined as though there were no information card on the client. Similarly, multiple virtual information cards can be defined based on existing information cards; nothing limits the system to defining only one virtual information.

Figure 10:
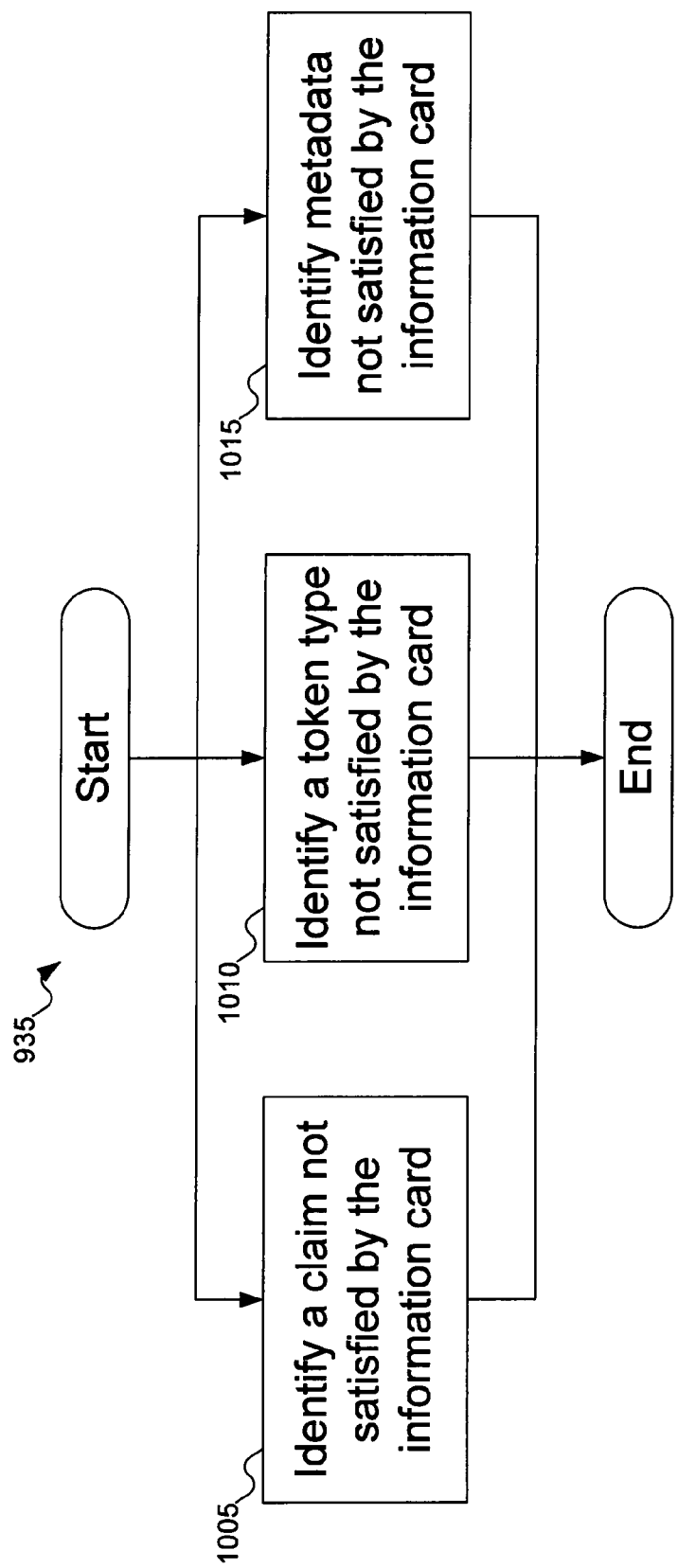
FIG. 10 shows a flowchart of a procedure for identifying information not in an information card to be included in a virtual information card.

FIG. 10 shows a flowchart of a procedure for identifying information not in an information card to be included in a virtual information card. In FIG. 10, at block 1005, the client can identify a claim in the security policy that is not satisfied by the information card. At block 1010, the client can identify a token type that is not satisfied by the information card. At block 1015, the client can identify any other metadata that is not satisfied by the information card.

Figure 11:
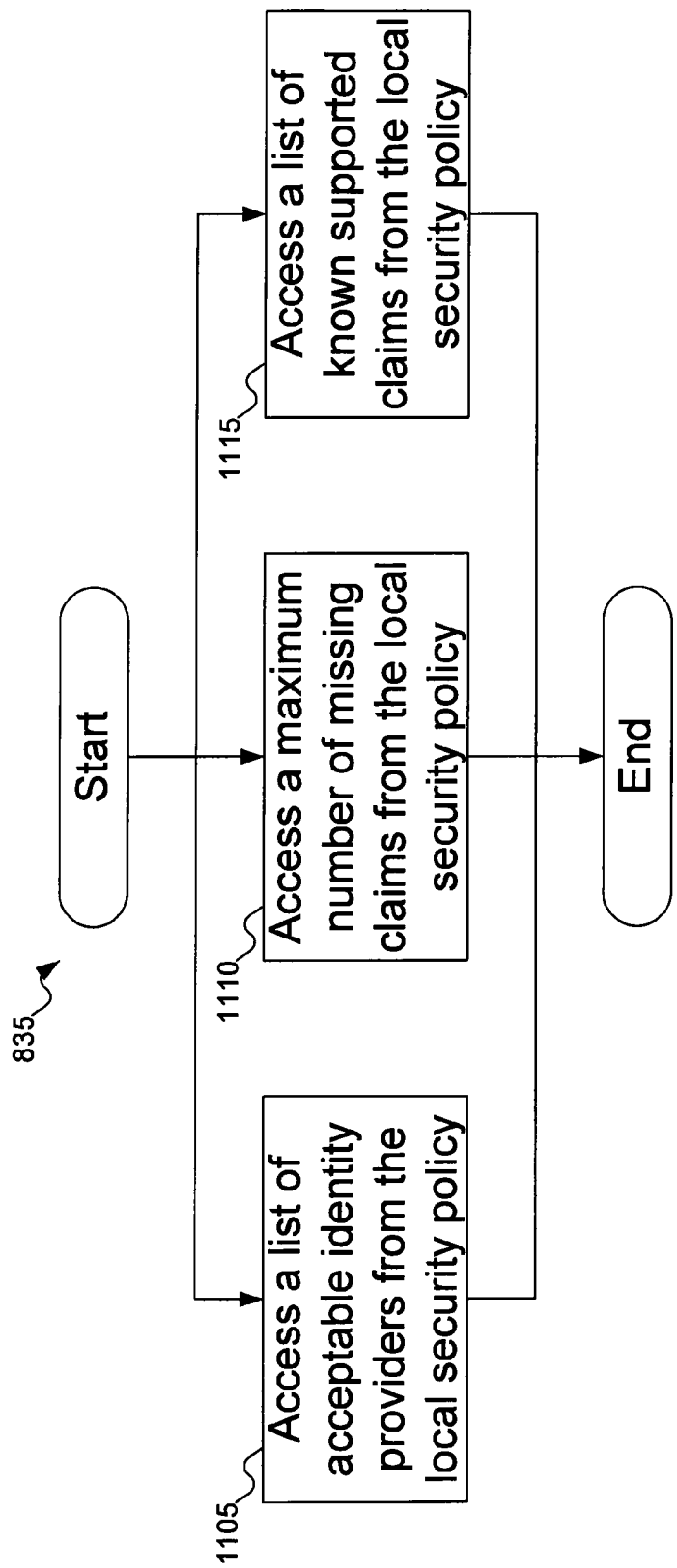
FIG. 11 shows a flowchart of a procedure for using a local security policy to control when a virtual information card is generated.

FIG. 11 shows a flowchart of a procedure for using a local security policy to control when a virtual information card is generated. At block 1105, the client can identify a list of acceptable identity providers that can be used to generate the security token. At block 1110, the client can identify a maximum number of claims that can be omitted from an information card. At block 1115, the client can identify a list of claims that must be satisfied by the information card.

The following discussion is intended to provide a brief, general description of a suitable machine in which certain aspects of the invention can be implemented. Typically, the machine includes a system bus to which is attached processors, memory, e.g., random access memory (RAM), read-only memory (ROM), or other state preserving medium, storage devices, a video interface, and input/output interface ports. The machine can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine can include embedded controllers, such as programmable or non-programmable logic devices or arrays, Application Specific Integrated Circuits, embedded computers, smart cards, and the like. The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention can be described by reference to or in conjunction with associated data including functions, procedures, data structures, application programs, instructions, etc. which, when accessed by a machine, result in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, and other tangible, physical storage media. Associated data can also be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as can come within the scope and spirit of the following claims and equivalents thereto.

The invention claimed is:

1. An apparatus, comprising:
   a client (105);
   a card selector (205) on the client (105);
   a receiver (210) on the client (105) to receive a security policy (150) from a relying party (130);
   a transmitter (215) to transmit a security token (160) to said relying party (130);
   at least one virtual information card policy (230) accessible from the client (105); and
   a virtual information card definer (235) to define at least one virtual information card (315) using the at least one virtual information card policy (230) and said security policy (150),
   where no existing information card (220) accessible from the card selector (205) can satisfy said security policy (150).

2. An apparatus according to claim 1, wherein the card selector (205) includes no information cards (220).

3. An apparatus according to claim 2, wherein the virtual information card definer (235) is operative to define a virtual information card (315) including a list of claims (610) in said security policy (150).

4. An apparatus according to claim 3, further comprising an adder (240) to add said virtual information card (315) to the card selector (205) as an information card (220).

5. An apparatus according to claim 1, wherein the card selector (205) includes no information cards (220) that satisfy said security policy (150).

6. An apparatus according to claim 5, wherein the virtual information card definer (235) includes:
   an information card identifier (305) to identify at least one information card (220) in the card selector (205) that nearly satisfies said security policy (150); and
   an augmenter (310) to augment said at least one information card (220) with information (620) in said security policy (150) that is missing from said information card (220), to define said at least one virtual information card (315).

7. An apparatus according to claim 6, wherein said information (620) in said security policy (150) that is missing from said information card (220) includes at least one claim (610).

8. An apparatus according to claim 6, wherein said information (620) in said security policy (150) that is missing from said information card (220) includes a token type (605).

9. An apparatus according to claim 6, wherein said information (620) in said security policy (150) that is missing from said information card (220) includes metadata (615).

10. An apparatus according to claim 6, further comprising an upgrader (245) to upgrade said at least one information card (220) so that said at least one information card (220) can satisfy said security policy (150).

11. An apparatus according to claim 1, wherein:
   the transmitter (215) is operative to transmit a request for said security token (160) from the client (105) to an identity provider (135), said request for said security token (160) based on one of said at least one virtual information cards (315); and
   the receiver (210) is operative to receive said security token (160) from said identity provider (135).

12. An apparatus according to claim 1, wherein:
the at least one virtual information card policy (230) includes a list (705) of acceptable identity providers (135); and
the virtual information card definer (235) is operative to define said at least one virtual information card (315) to request said security token (160) from one of the list (705) of acceptable identity providers (135).

13. An apparatus according to claim 1, wherein:
the at least one virtual information card policy (230) includes a maximum number (710) of claims that can be missing from an information card (220); and
the virtual information card definer (235) is operative to define said at least one virtual information card (315) based on an information card (220) that fails to satisfy at most the maximum number (710) of claims from the security policy (150).

14. An apparatus according to claim 1, wherein:
the at least one virtual information card policy (230) includes claims that should be included (715) in an information card (220); and
the virtual information card definer (235) is operative to define said at least one virtual information card (315) based on an information card (220) that omits only claims not included in the virtual information card policy (230).

15. A method, comprising:
receiving (805) a security policy (150) from a relying party (130) at a client (105);
determining (810, 815) that no information card (220) stored on the client (105) satisfies the security policy (150);
accessing (835) a virtual information card policy (230);
defining (845) at least one virtual information card (315) using the security policy (150) and the virtual information card policy (230) that can satisfy the security policy (150);
receiving (850) a selection of one of the at least one virtual information cards (315);
generating (855) a security token (160) responsive to the selected virtual information card (315); and
transmitting (830) the security token (160) to the relying party (130).

16. A method according to claim 15, wherein determining (810, 815) that no information card (220) stored on the client (105) satisfies the security policy (150) includes determining (810, 815) that there is no information card (220) stored on the client (105).

17. A method according to claim 16, wherein:
defining (845) at least one virtual information card (315) using the security policy (150) and the virtual information card policy (230) that can satisfy the security policy (150) includes defining (845, 910) a virtual information card (315) including a list of claims (610) requested in the security policy (150); and
generating (855) a security token (160) responsive to the selected virtual information card (315) includes requesting (915) a security token (160) from an identity provider (135) using the virtual information card (315).

18. A method according to claim 15, wherein defining (845) at least one virtual information card (315) using the security policy (150) and the virtual information card policy (230) that can satisfy the security policy (150) includes:
identifying (930) an information card (220) that nearly satisfies the security policy (150), the information card (220) including a first list of information that can be provided using the information card (220);
identifying (935) a second list of information (620) requested in the security policy (150) not provided by the information card (220); and
defining (845, 940) a virtual information card (315) including the first list of information and the second list of information.

19. A method according to claim 18, wherein generating (855) a security token (160) responsive to the selected virtual information card (315) includes requesting (915) a security token (160) from an identity provider (135) using the selected virtual information card (315), the security token (160) to include at least one claim to be satisfied using the second list of information.

20. A method according to claim 15, wherein:
accessing (835) a virtual information card policy (230) includes accessing (1105) the virtual information card policy (230), the virtual information card policy (230) specifying a list (705) of acceptable identity providers (135); and
defining (845) at least one virtual information card (315) using the security policy (150) and the virtual information card policy (230) that can satisfy the security policy (150) includes defining (845) at least one virtual information card (315) to request a security token (160) from one of the list (705) of acceptable identity providers (135).

21. A method according to claim 15, wherein:
accessing (835) a virtual information card policy (230) includes accessing (1110) the virtual information card policy (230), the virtual information card policy (230) specifying a maximum number (710) of claims that can be missing from an information card (220); and
defining (845) at least one virtual information card (315) using the security policy (150) and the virtual information card policy (230) that can satisfy the security policy (150) includes defining (845) at least one virtual information card (315) based on an information card (220) that fails to satisfy at most the maximum number (710) of claims from the security policy (150).

22. A method according to claim 15, wherein:
accessing (835) a virtual information card policy (230) includes accessing (1115) the virtual information card policy (230), the virtual information card policy (230) specifying claims that should be included (715) in an information card (220); and
defining (845) at least one virtual information card (315) using the security policy (150) and the virtual information card policy (230) that can satisfy the security policy (150) includes defining (845) at least one virtual information card (315) based on an information card (220) that omits only claims not included in the virtual information card policy (230).

23. An article, comprising a non-transitory storage medium, said non-transitory storage medium having stored thereon instructions that, when executed by a machine, result in:
receiving (805) a security policy (150) from a relying party (130) at a client (105);
determining (810, 815) that no information card (220) stored on the client (105) satisfies the security policy (150);
accessing (835) a virtual information card policy (230);
defining (845) at least one virtual information card (315) using the security policy (150) and the virtual information card policy (230) that can satisfy the security policy (150);

receiving (850) a selection of one of the at least one virtual information cards (315);

generating (855) a security token (160) responsive to the selected virtual information card (315); and transmitting (830) the security token (160) to the relying party (130).

24. An article according to claim 23, wherein determining (810, 815) that no information card (220) stored on the client (105) satisfies the security policy (150) includes determining (810, 815) that there is no information card (220) stored on the client (105).

25. An article according to claim 24, wherein:

defining (845) at least one virtual information card (315) using the security policy (150) and the virtual information card policy (230) that can satisfy the security policy (150) includes defining (845, 910) a virtual information card (315) including a list of claims (610) requested in the security policy (150); and generating (855) a security token (160) responsive to the selected virtual information card (315) includes requesting (915) a security token (160) from an identity provider (135) using the virtual information card (315).

26. An article according to claim 23, wherein defining (845) at least one virtual information card (315) using the security policy (150) and the virtual information card policy (230) that can satisfy the security policy (150) includes:

identifying (930) an information card (220) that nearly satisfies the security policy (150), the information card (220) including a first list of information that can be provided using the information card (220);

identifying (935) a second list of information (620) requested in the security policy (150) not provided by the information card (220); and defining (845, 940) a virtual information card (315) including the first list of information and the second list of information.

27. An article according to claim 26, wherein generating (855) a security token (160) responsive to the selected virtual information card (315) includes requesting (915) a security token (160) from an identity provider (135) using the selected virtual information card (315), the security token (160) to include at least one claim to be satisfied using the second list of information.

28. An article according to claim 23, wherein:

accessing (835) a virtual information card policy (230) includes accessing (1105) the virtual information card policy (230), the virtual information card policy (230) specifying a list (705) of acceptable identity providers (135); and defining (845) at least one virtual information card (315) using the security policy (150) and the virtual information card policy (230) that can satisfy the security policy (150) includes defining (845) at least one virtual information card (315) to request a security token (160) from one of the list (705) of acceptable identity providers (135).

29. An article according to claim 23, wherein:

accessing (835) a virtual information card policy (230) includes accessing (1110) the virtual information card policy (230), the virtual information card policy (230) specifying a maximum number (710) of claims that can be missing from an information card (220); and defining (845) at least one virtual information card (315) using the security policy (150) and the virtual information card policy (230) that can satisfy the security policy (150) includes defining (845) at least one virtual information card (315) based on an information card (220) that fails to satisfy at most the maximum number (710) of claims from the security policy (150).

30. An article according to claim 23, wherein:

accessing (835) a virtual information card policy (230) includes accessing (1115) the virtual information card policy (230), the virtual information card policy (230) specifying claims that should be included (715) in an information card (220); and defining (845) at least one virtual information card (315) using the security policy (150) and the virtual information card policy (230) that can satisfy the security policy (150) includes defining (845) at least one virtual information card (315) based on an information card (220) that omits only claims not included in the virtual information card policy (230).

31. A method according to claim 15, wherein defining (845) at least one virtual information card (315) using the security policy (150) and the virtual information card policy (230) that can satisfy the security policy (150) occurs after determining (810, 815) that no information card (220) stored on the client (105) satisfies the security policy (150).

32. An article according to claim 23, wherein defining (845) at least one virtual information card (315) using the security policy (150) and the virtual information card policy (230) that can satisfy the security policy (150) occurs after determining (810, 815) that no information card (220) stored on the client (105) satisfies the security policy (150).

33. A method according to claim 15, further comprising adding (920) the virtual information card (315) to the card selector (205) as an information card (220).

34. An article according to claim 23, further comprising adding (920) the virtual information card (315) to the card selector (205) as an information card (220).

* * * * *